US011930984B2

(12) United States Patent
Ryan

(10) Patent No.: US 11,930,984 B2
(45) Date of Patent: Mar. 19, 2024

(54) DISHWASHING APPLIANCE HAVING A DOOR LINKAGE ASSEMBLY

(71) Applicant: Haier US Appliance Solutions, Inc., Wilmington, DE (US)

(72) Inventor: Jeremy Joseph Ryan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 352 days.

(21) Appl. No.: 17/316,896

(22) Filed: May 11, 2021

(65) Prior Publication Data

US 2022/0361727 A1 Nov. 17, 2022

(51) Int. Cl.
*A47L 15/42* (2006.01)
*E05F 1/10* (2006.01)

(52) U.S. Cl.
CPC ........ *A47L 15/4261* (2013.01); *E05F 1/1066* (2013.01); *E05Y 2900/304* (2013.01)

(58) Field of Classification Search
CPC ............... A47L 15/4261; E05F 1/1066; E05Y 2900/304
See application file for complete search history.

(56) References Cited

U.S. PATENT DOCUMENTS 9,642,511 B2 5/2017 Anderson
10,111,575 B2 * 10/2018 Torrentes ............ A47L 15/4261
10,231,595 B2 3/2019 Kiesler
2011/0241507 A1 * 10/2011 Diebold .............. A47L 15/4261 312/328
2013/0193819 A1 * 8/2013 Kozinski ............. A47L 15/4261 312/293.3
2017/0086644 A1 * 3/2017 Ryan ..................... F24C 15/023
2017/0086645 A1 * 3/2017 Shoup ................. A47L 15/4261
2023/0062504 A1 * 3/2023 Ko ...................... A47L 15/4265

FOREIGN PATENT DOCUMENTS

JP 2002143071 A 5/2002

* cited by examiner

*Primary Examiner* — Daniel J Rohrhoff
(74) *Attorney, Agent, or Firm* — Dority & Manning, P.A.

(57) ABSTRACT

A dishwashing appliance may include a cabinet, a tub, a door, a spring linkage, and a bent linkage latch. The cabinet may extend laterally between a pair of opposing lateral sides. The door may be rotatably positioned at a front opening and providing selective access to a wash chamber of the cabinet. The spring linkage may bias the door toward a closed position. The spring linkage may extend from a first end to a second end. The first end may be mounted to the cabinet. The second end may include a fastener selectively attached to the door. The bent linkage latch may extend laterally from the cabinet at one of the pair of opposing lateral sides below the door along a vertical direction. The bent linkage latch defining a vertically open latch channel to selectively receive the spring linkage when the fastener is detached from the door.

20 Claims, 8 Drawing Sheets

DISHWASHING APPLIANCE HAVING A DOOR LINKAGE ASSEMBLY

FIELD OF THE INVENTION

The present subject matter relates generally to appliances, and more particularly to dishwashing appliances having a linkage assembly for in-situ removal of a door from an installed dishwashing appliance.

BACKGROUND OF THE INVENTION

Dishwasher appliances generally include a tub that defines a wash chamber for receipt of articles for washing. A door provides for selective access to the wash chamber. For example, the door can be rotatably mounted to the wash tub with a hinge. The door can selectively adjust between an open and a closed position by rotating about the hinge in order to permit access to the wash chamber.

Typically, removal of a dishwasher door requires the hinge arms to disconnect from the door while the hinges stay connected to the tub and spring system. In order to maintain proper door stiffness in relation to the hinge arms, the hinge arms must stay connected to the door during removal of the door. This requires removal of the entire dishwasher from the cabinet in order to access the spring linkage and remove the door. Removal of the entire dishwasher from the cabinet is undesirable because of, for example, the additional labor involved with removing and reinstalling the appliance in the cabinet and accidental damage to cabinets and floors. Moreover, removing the door may require angling the door, which may add potential energy to door balance system. This increase in potential energy may create a safety risk and increase the difficulty for door removal.

Some existing systems have attempted to address such concerns with complex multi-part designs (e.g., to permit separation of one or more hinge arms). Such systems may increase the costs or difficulty required for production. Additionally or alternatively, such systems may create undesirable instabilities, which may decrease the robustness or reliability of the systems.

Accordingly, a need arises for an appliance that allows for easy removal of the door. It may also be advantageous to provide dishwashing appliances that allow for removal of the dishwasher door without requiring removal of the dishwasher from the cabinet. Moreover, it may be especially advantageous to provide a dishwashing appliance wherein tension may be maintained in a balance assembly even when the balance assembly is not attached to the door. Furthermore, it may be advantageous if such an appliance could improve balance assembly robustness or reliability (e.g., in comparison to existing systems).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dishwashing appliance is provided. The dishwashing appliance may include a cabinet, a tub, a door, a spring linkage, and a bent linkage latch. The cabinet may define a wash chamber for the receipt of articles for washing and may extend laterally between a pair of opposing lateral sides. The tub may be disposed inside the cabinet and define a front opening. The door may be rotatably positioned at the front opening and providing selective access to the wash chamber of the cabinet. The spring linkage may bias the door toward a closed position. The spring linkage may extend from a first end to a second end. The first end may be mounted to the cabinet. The second end may include a fastener selectively attached to the door. The bent linkage latch may extend laterally from the cabinet at one of the pair of opposing lateral sides below the door along a vertical direction. The bent linkage latch defining a vertically open latch channel to selectively receive the spring linkage when the fastener is detached from the door.

In another exemplary aspect of the present disclosure, a dishwashing appliance is provided. The dishwashing appliance may include a cabinet, a tub, a door, a hinge, a spring linkage, and a bent linkage latch. The cabinet may define a wash chamber for the receipt of articles for washing and may extend laterally between a pair of opposing lateral sides. The tub may be disposed inside the cabinet and define a front opening. The door may be rotatably positioned at the front opening and providing selective access to the wash chamber of the cabinet. The spring linkage may bias the door toward a closed position. The spring linkage may extend from a first end to a second end. The first end may be mounted to the cabinet. The second end may include a fastener selectively attached to the hinge. The bent linkage latch may extend laterally from the cabinet at one of the pair of opposing lateral sides below the door along a vertical direction. The bent linkage latch may define a vertically open latch channel as a U-shaped passage to selectively receive the spring linkage when the fastener is detached from the hinge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
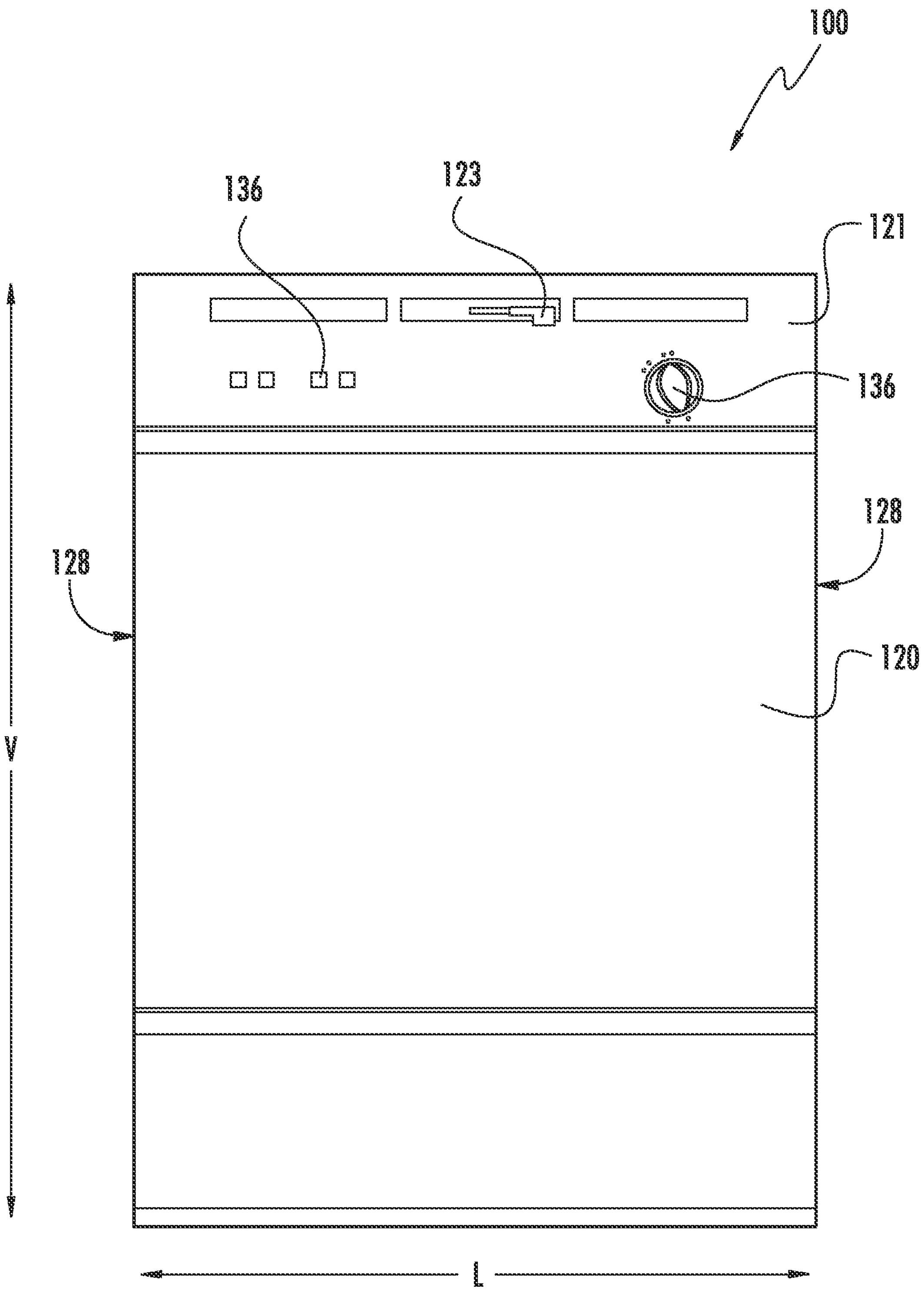
FIG. 1 provides a front elevation view of a dishwashing appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term “or” is generally intended to be inclusive (i.e., “A or B” is intended to mean “A or B or both”). The singular forms “a,” “an,” and “the” include plural references unless the context clearly dictates otherwise.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure provides an appliance that has a rotating door that is removably coupled to a cabinet of the appliance. A spring linkage is selectively attached to door, e.g., to provide a counter-balance force for door rotation. A linkage latch is provided to receive the spring linkage when the spring linkage is decoupled or not attached to the door.

Figure 2:
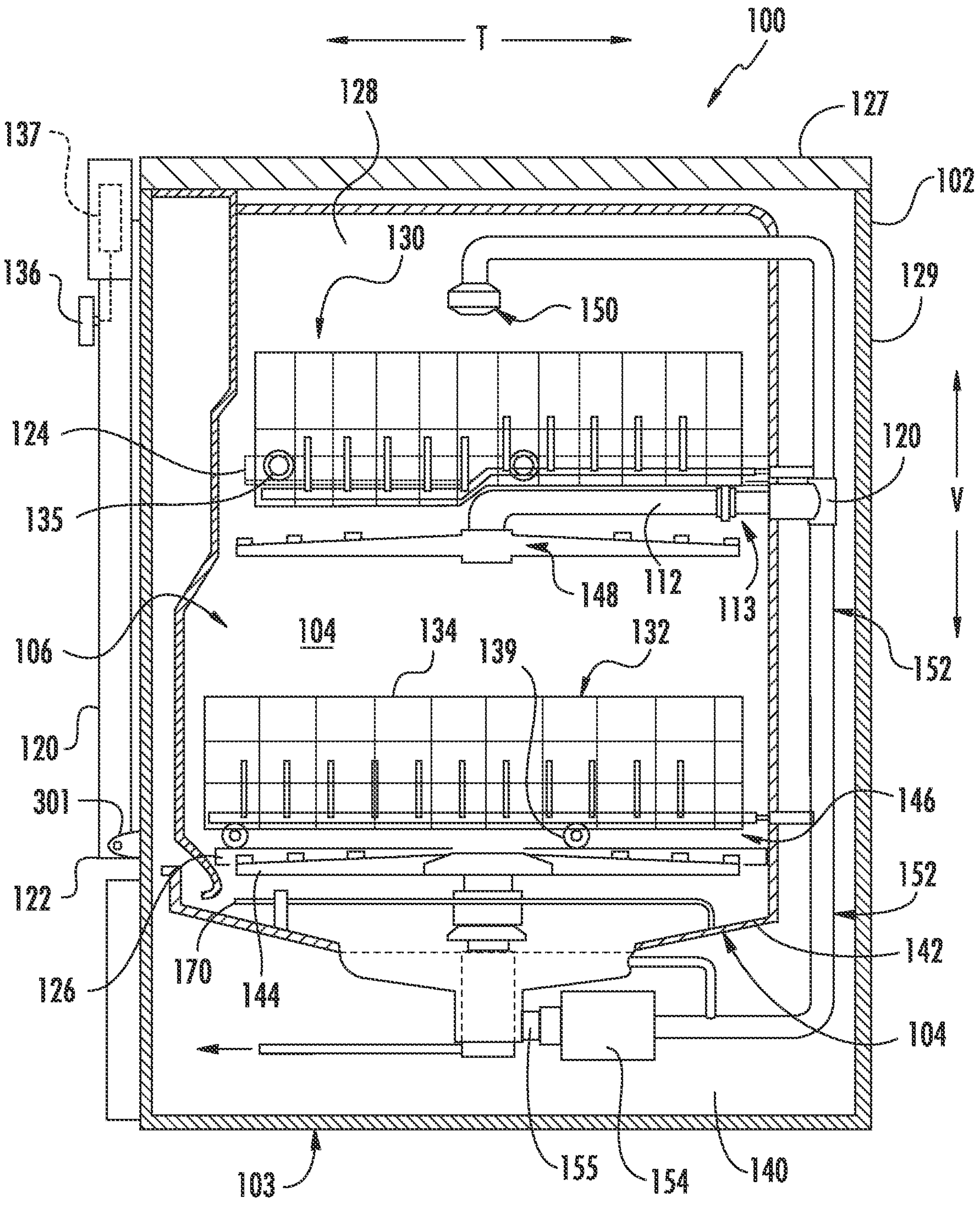
FIG. 2 provides a side sectional view of the exemplary dishwashing appliance of FIG. 1.

FIGS. 1 and 2 depict an example domestic dishwasher appliance 100 that may be configured in accordance with aspects of the present disclosure. Mutually-orthogonal lateral direction L, transverse direction T, and vertical direction V are shown in the figures. For the particular embodiment of FIGS. 1 and 2, the dishwasher 100 includes a cabinet 102 having a tub 104 therein that defines a wash chamber 106. The tub 104 includes a front opening and a door 120 hinged at its bottom 122 for movement between a normally closed vertical position (shown in FIGS. 1 and 2), wherein the wash chamber 106 is sealed shut for washing operations, and a horizontal open position for loading and unloading of articles from the dishwasher. Latch 123 is used to lock and unlock door 120 for access to wash chamber 106. The cabinet 102 generally extends (e.g., laterally) between opposing lateral sides 128 and may include one or more walls, such as a pair of opposing sidewalls, a top wall 127, or a rear wall 129. A tub 104 is disposed inside the cabinet 102 and configured with a front opening for receipt of a door 120 hinged at its bottom 122.

It is noted that, as used herein, the terms “cabinet,” “housing,” and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present disclosure.

Upper and lower guide rails 124, 126 are mounted on side walls of tub 104 and accommodate roller-equipped rack assemblies 130 and 132. Each of the rack assemblies 130, 132 is fabricated into lattice structures including a plurality of elongated members 134 (for clarity of illustration, not all elongated members making up assemblies 130 and 132 are shown in FIG. 2). Each rack 130, 132 is adapted for movement between an extended loading position (not shown), in which the rack is substantially positioned outside the wash chamber 106, and a retracted position (shown in FIGS. 1 and 2), in which the rack is located inside the wash chamber 106. This rack movement is facilitated by rollers 135 and 139, for example, mounted onto racks 130 and 132, respectively. A silverware basket (not shown) may be removably attached to rack assembly 132 for placement of silverware, utensils, and the like, that are otherwise too small to be accommodated by the racks 130, 132.

The dishwasher 100 further includes a lower spray-arm assembly 144 that is rotatably mounted within a lower region 146 of the wash chamber 106 and above a tub sump portion 142 so as to rotate in relatively close proximity to rack assembly 132. A mid-level spray-arm assembly 148 is located in an upper region of the wash chamber 106 and may be located in close proximity to upper rack 130. Additionally, an upper spray assembly 150 may be located above upper rack 130. Although a stationary spray assembly 150 is shown, an upper spray arm assembly may be used as well. Other fluid emitting devices for cleaning articles may be used at the lower, middle, and/or upper positions as well.

The lower and mid-level spray-arm assemblies 144, 148 and the upper spray assembly 150 are in fluid communication with a pump 154 and a main supply conduit 152 for circulating fluids (e.g., wash or rinse) in the tub 104. The main supply conduit 152 is served by a recirculation pump 154 positioned in a machinery compartment 140 located below the tub sump portion 142 (i.e., bottom wall) of the tub 104, as generally recognized in the art. Pump 154 receives fluid from sump 142 to provide a flow to the main supply conduit 152. A heating element 170 can be used to provide heat during e.g., a drying cycle.

Each spray-arm assembly 144, 148 includes an arrangement of discharge ports or orifices for directing washing fluid received from pump 154 onto dishes or other articles located in rack assemblies 130 and 132. The arrangement of the discharge ports in spray-arm assemblies 144, 148 provides a rotational force by virtue of washing fluid flowing through the discharge ports. The resultant rotation of the spray-arm assemblies 144, 148 and the operation of spray assembly 150 using fluid from pump 154 provides coverage of dishes and other dishwasher contents with a washing spray. Other configurations of spray assemblies may be used as well.

The middle spray-arm assembly 148 is releasably connected with fluid supply conduit 152 by way of a diverter 200 as further described herein. Specifically, as rack 130 is moved in and out of chamber 106, fluid supply conduit 112 releasably connects or disconnects from diverter 200. Other configurations may also be used.

The dishwasher 100 is further equipped with a controller 137 to regulate operation of the dishwasher 100. The controller may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area 121 of door 120 as shown in FIGS. 1 and 2. In such an embodiment, input/output ("I/O") signals may be routed between the control system and various operational components of dishwasher 100 along wiring harnesses that may be routed through the bottom 122 of door 120. Typically, the controller 137 includes a user interface panel/controls 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

It should be appreciated that the invention is not limited to any particular style, model, or configuration of domestic appliance. The exemplary embodiment depicted in FIGS. 1 and 2 is for illustrative purposes only. For example, different locations may be provided for user interface 136, different configurations may be provided for racks 130, 132, different spray devices and spray arm assemblies may be used, and other differences may be applied as well.

Turning now especially to FIGS. 3 through 8, portions of a balance assembly 300 are illustrated according to exemplary embodiments. As shown, balance assembly 300 may attach door 120 to cabinet 102. A pair of hinges 301 is disposed proximate to opposing lateral sides 128 of cabinet 102. Each hinge 301 generally defines a top edge 302, bottom edge 304, hinge distal end 306, and hinge proximal end 308. In some embodiments, the hinge proximal end 308 is removably coupled to the door 120. As shown, each hinge 301 extends from door 120 toward cabinet 102. When assembled, each hinge 301 is rotationally fixed to door 120, e.g., via an adhesive or a mechanical attachment member, such as a screw or clip. As door 120 rotates, each hinge 301 may thus rotate with door 120.

The hinge distal end 306 is spaced apart along the transverse direction T from hinge proximal end 308. In some embodiments, hinge distal end 306 defines a groove 310 that generally extends in the vertical direction V, e.g., when door 120 is in the closed position. For instance, groove 310 may be defined such that groove 310 extends vertically upward from bottom edge 304 toward top edge 302. In the illustrated embodiments, groove 310 terminates before reaching top edge 302. In other words, groove 310 may be open to bottom edge 304, but closed to top edge 302. Optionally, groove 310 may be defined at an angle relative to vertical direction V, e.g., in the general direction of cabinet 102 away from door 120. Additionally or alternatively, groove 310 may define a hook shape (e.g., inverted J-shape) including a protruding bottom lip onto which a spring linkage 312 may attach.

When assembled, at least one spring linkage 312 is coupled to one hinge 301. Generally, spring linkage 312 attaches hinge 301 to cabinet 102 and biases door 120 toward the closed position. As shown, spring linkage 312 extends from a first end 316 to a second end 318. In some embodiments, first end 316 is mounted to cabinet 102. Second end 318 may be selectively attached to door 120.

In certain embodiments, a fastener 320 is fixed to spring linkage 312, e.g., at second end 318. When assembled, fastener 320 selectively attaches door 120 to spring linkage 312. For example, fastener 320 may include a rigid body 322 and a groove leg 326. Groove leg 326 may extend from rigid body 322 and be sized to fit within groove 310 of hinge 301. Specifically, when received by groove 310, groove leg 326 may extend in the lateral direction L from a flange 328 of rigid body 322. Optionally, groove leg 326 may be sandwiched between two opposing flanges 328. Additionally or alternatively, groove leg 326 may be provided as a clevis member. Moreover, groove leg 326 may selectively slide in and out of groove 310, e.g., as directed by a user or installer attaching and/or detaching fastener 320 from hinge 301.

Optionally, rigid body 322 may define one or more bore holes 330. Specifically, a bore hole 330 may be defined through the flange(s) 328 of rigid body 322. Each bore hole 330 may be formed for complementary receipt of a linkage removal tool (not pictured). When assembled, linkage removal tool may thus gain access to the fastener 320 from the front of the dishwasher after removal of a dishwasher toekick panel. A collar 334 extends from flange(s) 328 of rigid body 322 in some embodiments, e.g., in the direction of the first end 316.

Figure 7:
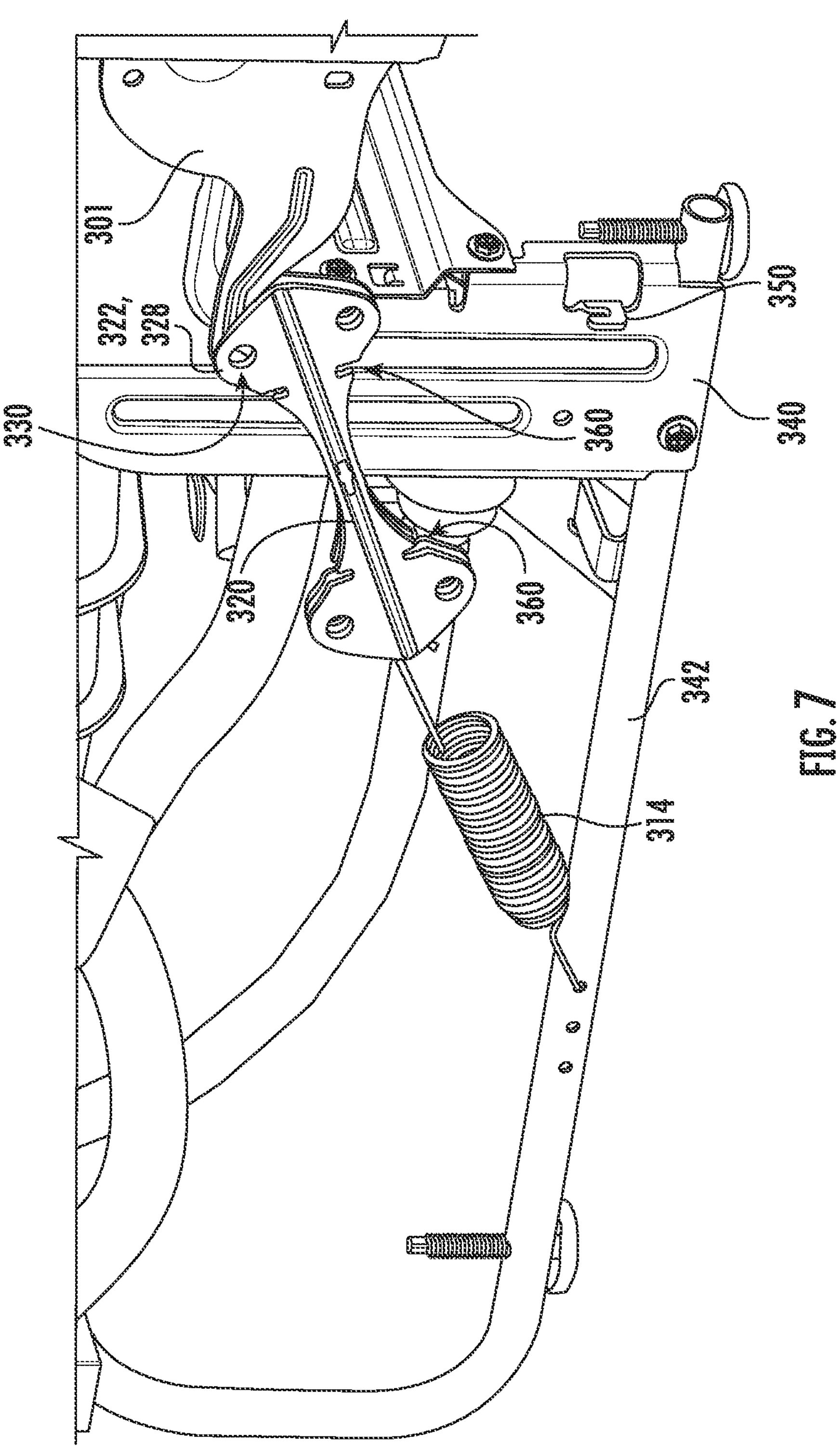
FIG. 7 provides a perspective view of a portion of a door balance assembly according to alternative example embodiments of the present disclosure.
Figure 8:
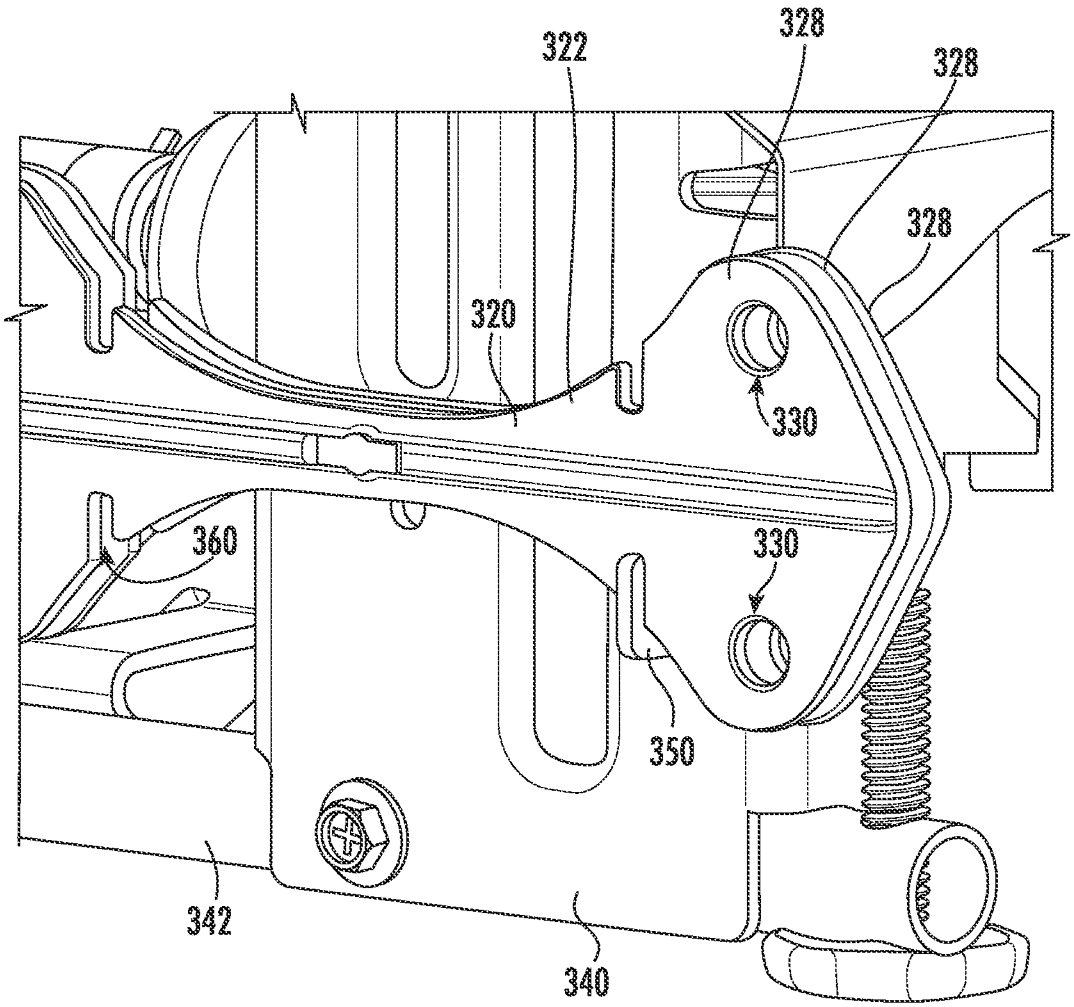
FIG. 8 provides a perspective view of a portion of the exemplary balance assembly of FIG. 7 when a spring linkage is received by a linkage latch.

As shown, certain embodiments of spring linkage 312 include a tension spring 314, e.g., coil spring. When assembled, tension spring 314 may elastically stretch from the closed position to the open position. Conversely, tension spring 314 may contract from the open position to the closed position, e.g., as tension spring 314 biases door 120 toward the closed position. Tension spring 314 may be positioned to generally extend along a portion of spring linkage 312, e.g., between the first end 316 and the second end 318. In some embodiments, tension spring 314 is coupled to cabinet 102 at first end 316. For instance, tension spring 314 may include a hook received by an aperture defined through a frame 342 of cabinet 102, which may extend along a bottom portion of the cabinet 102 or be attached (e.g., via one or more suitable mechanical fasteners, adhesives, or welds) to one or both support legs 340. Although only shown as a sub-portion of the length between the first end 316 and the second end 318 in FIGS. 3 through 5, alternative embodiments of tension spring 314 may extend fully as the entirety of spring linkage 312 from first end 316 to second end 318, e.g., such that fastener 320 extends directly from tension spring 314, as illustrated in FIGS. 7 and 8.

Figure 3:
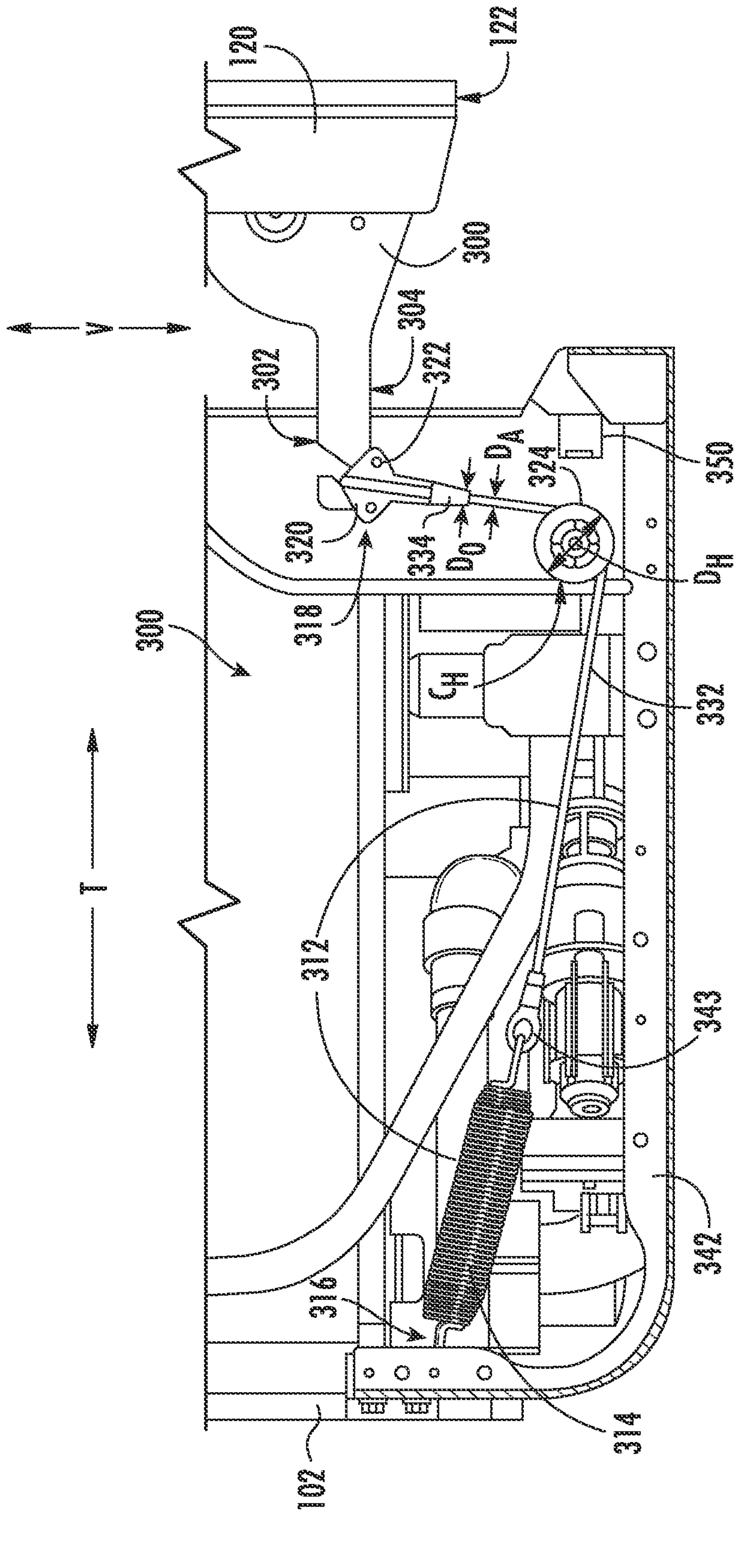
FIG. 3 provides a side elevation view of a balance assembly in an appliance according to exemplary embodiments of the present disclosure.
Figure 4:
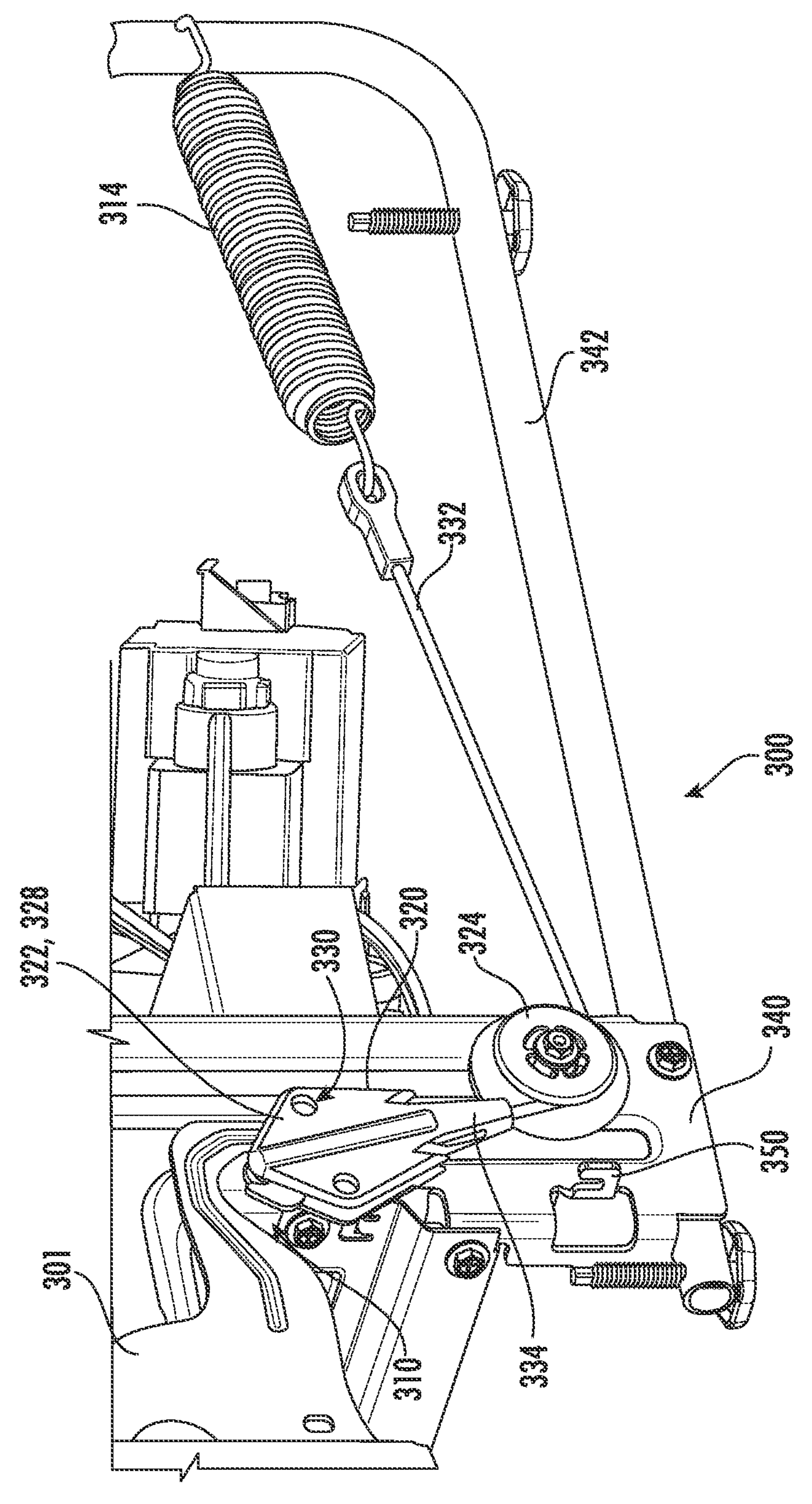
FIG. 4 provides a perspective view of the exemplary balance assembly of FIG. 3.
Figure 5:
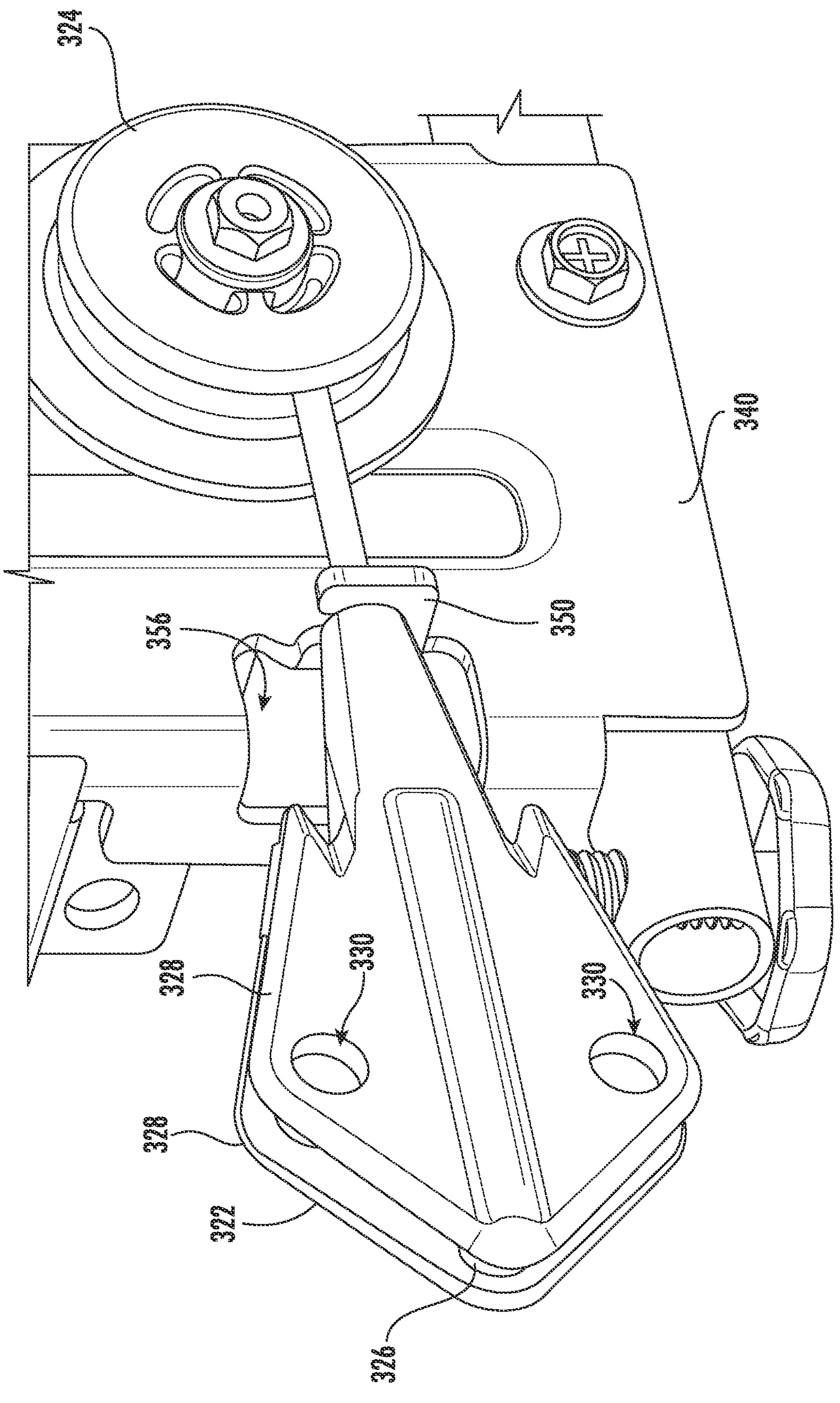
FIG. 5 provides a perspective view of a portion of the exemplary balance assembly of FIG. 3 when a spring linkage is received by a linkage latch.
Figure 6:
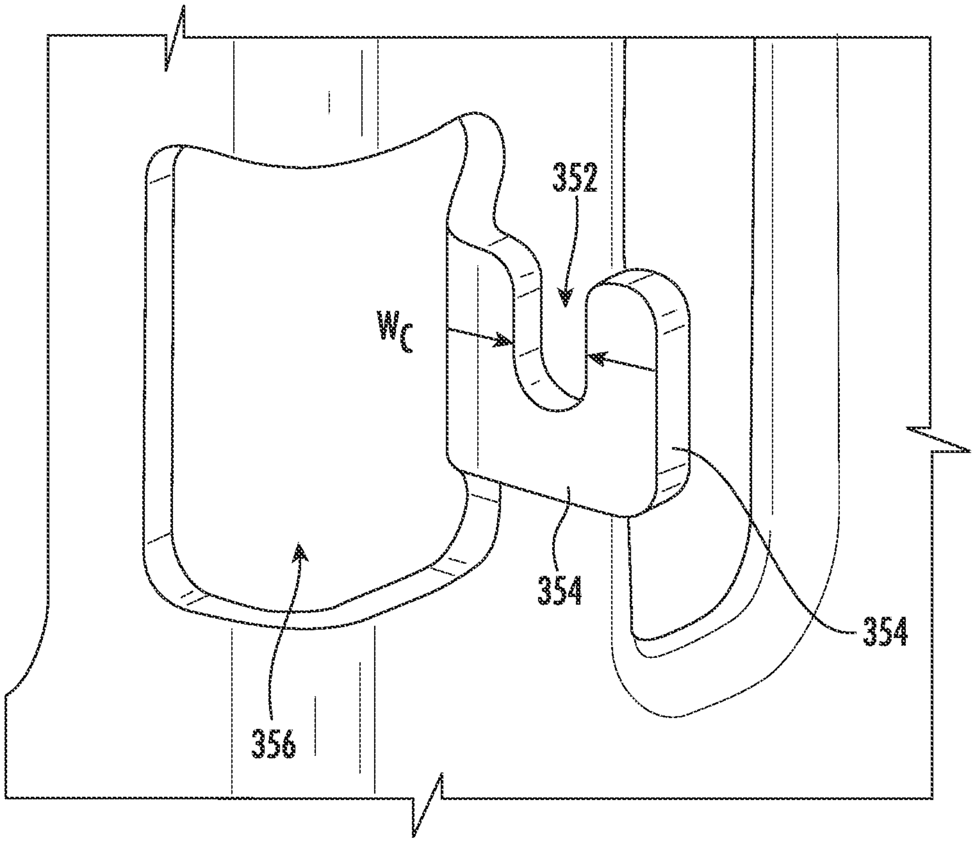
FIG. 6 provides a perspective view of the bent linkage latch of a balance assembly according to exemplary embodiments of the present disclosure.

As shown in FIGS. 3 through 5, in certain embodiments, spring linkage 312 includes a cable 332, e.g., wound steel cable 332. In the illustrated embodiments, cable 332 is fixed to fastener 320. Cable 332 may also be fixed to tension spring 314. Specifically, cable 332 may extend along a portion of spring linkage 312 between the tension spring 314 and the fastener 320. In optional embodiments, a cable eyelet 343 is mounted to cable 332 and coupled to tension spring 314. Cable 332 may join to fastener 320 at collar 334. Collar 334 may receive cable 332 such that collar 334 defines a diameter $D_O$ that is greater than the diameter $D_A$ of cable 332. When assembled, tension spring 314 may thus apply tension to cable 332, which in turn pulls on hinge 301 using fastener 320.

Returning generally to FIGS. 3 through 8, in some embodiments, a guide wheel 324 is rotatably mounted to cabinet 102. For instance, guide wheel 324 may be attached to cabinet 102 proximate to one of the pair of opposing lateral sides 128. Optionally, guide wheel 324 may be attached to a support leg 340 of cabinet 102 (e.g., formed of a suitably rigid metal). As shown, guide wheel 324 defines a wheel diameter $D_H$ and circumference $C_H$. When assembled, a portion of spring linkage 312, e.g., cable 332, may be disposed along a portion of the circumference $C_H$ of guide wheel 324. Guide wheel 324 may thus engage a portion of spring linkage 312. Moreover, cable 332 may be directed beneath guide wheel 324, e.g., such that a portion of cable 332 is disposed along a bottom portion of guide wheel 324, e.g., circumference $C_H$ of guide wheel 324. When spring linkage 312 is attached to door 120, cable 332 may be wound along circumference $C_H$ of guide wheel 324 from the bottom portion of guide wheel 324 upward along the vertical direction V toward hinge 301, which may be positioned above guide wheel 324. During use, guide wheel 324 may thus maintain tension on spring linkage 312, e.g., as spring linkage 312 biases door 120 between the open position and the closed position.

A bent linkage latch 350 may be provided on cabinet 102. Specifically, bent linkage latch 350 may extend laterally (i.e., in the lateral direction L) away from one of the pair of opposing lateral sides 128 below the door 120 along the vertical direction V. Bent linkage latch 350 may be disposed below hinge 301 along the vertical direction V. Moreover, bent linkage latch 350 may be positioned forward from guide wheel 324 along the transverse direction T, e.g., between guide wheel 324 and door 120 along the transverse direction T.

Generally, bent linkage latch 350 may be formed by bending out an outer segment of cabinet 102. For instance, a segment of at least one metal support leg 340 may be cut according to the general shape of bent linkage latch 350 before that segment is bent (e.g., pivoted) outward or rearward to extend laterally (e.g., perpendicular to the transverse direction T). Optionally, each metal support leg 340 (e.g., of a pair of support legs 340 positioned at opposite lateral sides 128) may manipulated to form a discrete bent linkage latch 350. Although portions of metal support leg 340 may be cut or otherwise manipulated, bent linkage latch 350 may extend directly from a corresponding support leg 340. For instance, bent linkage latch 350 may be integral with its corresponding support leg 340. In other words, bent linkage latch 350 and support leg 340 may form a monolithic unitary member. Moreover, a forward lateral opening or gap 356 in front of bent linkage latch 350 may be formed or defined in support leg 340, e.g., as a result of the removal the segment for bent linkage latch 350).

In some embodiments, bent linkage latch 350 is disposed or formed at a front portion of cabinet 102, e.g., behind the toekick panel at a front support leg 340. In some embodiments, bent linkage latch 350 is positioned to avoid interference with spring linkage 312 when fastener 320 is attached to door 120. Optionally, bent linkage latch 350 may be positioned below a top portion of guide wheel 324 along the vertical direction V.

Bent linkage latch 350 is generally positioned receive a portion of spring linkage 312. Specifically, bent linkage latch 350 is positioned to maintain tension along spring linkage 312 when fastener 320 is detached from hinge 301. In certain embodiments, bent linkage latch 350 defines a vertically open channel 352 that selectively receives spring linkage 312. In turn, channel 352 may receive a portion of spring linkage 312 (e.g., from above) when fastener 320 is detached from door 120 or hinge 301. Optionally, spring linkage 312 may be directed outside of and away from channel 352 when fastener 320 is attached to door 120 or hinge 301.

In some embodiments, the channel 352 of bent linkage latch 350 is defined as a U-shaped passage in a latch body 354 to receive a portion of spring linkage 312. Thus, latch body 354 may define a pair of opposing arms connected from below by a bottom arm, while remaining separated at a top end of the latch body 354.

Channel 352 may be generally sized and shaped to accommodate or receive a portion of spring linkage 312. As an example, and as shown in FIGS. 3 through 5, channel 352 may accommodate or receive cable 332 therein. The diameter $D_O$ of collar 334 may be greater than a width $W_C$ of channel 352. When cable 332 is received within channel 352, collar 334 may thus engage a perimeter edge of bent linkage latch 350. When fastener 320 is detached from hinge 301, the engagement between fastener 320 and bent linkage latch 350 may secure spring linkage 312 in tension as, e.g., tension spring 314, biases fastener 320 rearward.

As another example, and as shown in FIGS. 7 and 8, channel 352 may accommodate or receive fastener 320 directly therein. The lateral width of rigid body 322 may be less than a width $W_C$ of channel 352. Additionally or alternatively, rigid body 322 may define a recess notch 360 that is complementary to channel 352 to be received therein. As shown, recess notch 360 may extend, e.g., upward, through fastener without extending fully therethrough. When fastener 320 is detached from hinge 301, latch body 354 may be received withing recess notch 360 while a top portion of recess notch 360 rests on the bottom arm of latch body 354. Thus, engagement between latch body 354 and fastener 320 may secure spring linkage 312 in tension as, e.g., tension spring 314, biases fastener 320 rearward.

Advantageously, embodiments of appliance 100 and assembly 300 described above may advantageously permit for removal of the dishwasher door without requiring removal of the appliance 100 from the surrounding storage cabinets. Moreover, such embodiments of appliance 100 and assembly 300 may offer improved reliability (e.g., in comparison to existing systems) and may not require additional components to be attached to cabinet 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance defining a mutually-orthogonal vertical direction, lateral direction, and transverse direction, the dishwashing appliance comprising:

a cabinet defining a wash chamber for the receipt of articles for washing, the cabinet extending laterally between a pair of opposing lateral sides;

a tub disposed inside the cabinet and defining a front opening;

a door rotatably positioned at the front opening and providing selective access to the wash chamber of the cabinet;

a spring linkage biasing the door toward a closed position, the spring linkage extending from a first end to a second end, the first end being mounted to the cabinet, the second end including a fastener selectively attached to the door; and a bent linkage latch extending laterally from the cabinet at one of the pair of opposing lateral sides below the door along the vertical direction, the bent linkage latch defining a vertically open latch channel to selectively receive the spring linkage when the fastener is detached from the door, wherein the spring linkage defines a recess notch complementary to the vertically open latch channel to be received therein.

2. The dishwashing appliance of claim 1, wherein the cabinet comprises a metal support leg, and wherein the bent linkage latch extends directly from the support leg.

3. The dishwashing appliance of claim 2, wherein the bent linkage latch is integral with the metal support leg.

4. The dishwashing appliance of claim 1, wherein the vertically open latch channel is defined as a U-shaped passage.

5. The dishwashing appliance of claim 1, wherein the spring linkage includes a tension spring extending along a portion of the spring linkage between the first end and the second end.

6. The dishwashing appliance of claim 5, wherein the spring linkage further includes a cable extending along a portion of the spring linkage between the tension spring and the fastener.

7. The dishwashing appliance of claim 1, further comprising a guide wheel rotatably mounted to the cabinet, wherein the spring linkage is disposed along a bottom portion of the guide wheel.

8. The dishwashing appliance of claim 1, wherein the cabinet includes a frame extending along a bottom portion of the cabinet, and wherein the bent linkage latch is mounted to the frame opposite from the wash chamber along the lateral direction.

9. The dishwashing appliance of claim 1, further comprising a hinge extending from the door toward the cabinet, wherein the fastener includes a rigid body and a groove leg, and wherein the groove leg is selectively received by the hinge.

10. The dishwashing appliance of claim 9, wherein the rigid body defines a bore hole to receive a linkage removal tool.

11. A dishwashing appliance defining a mutually-orthogonal vertical direction, lateral direction, and transverse direction, the dishwashing appliance comprising:

a cabinet defining a wash chamber for the receipt of articles for washing, the cabinet extending laterally between a pair of opposing lateral sides;

a tub disposed inside the cabinet and defining a front opening;

a door rotatably positioned at the front opening and providing selective access to the wash chamber of the cabinet;

a hinge rotationally fixed to the door;

a spring linkage biasing the door toward a closed position, the spring linkage extending from a first end to a second end, the first end being mounted to the cabinet, the second end including a fastener selectively attached to the hinge; and a bent linkage latch extending laterally from the cabinet at one of the pair of opposing lateral sides below the door along the vertical direction, the bent linkage latch defining a vertically open latch channel as a U-shaped passage to selectively receive the spring linkage when the fastener is detached from the hinge, wherein the spring linkage defines a recess notch complementary to the vertically open latch channel to be received therein.

12. The dishwashing appliance of claim 11, wherein the cabinet comprises a metal support leg, and wherein the bent linkage latch extends directly from the support leg.

13. The dishwashing appliance of claim 12, wherein the bent linkage latch is integral with the metal support leg.

14. The dishwashing appliance of claim 11, wherein the spring linkage includes a tension spring extending along a portion of the spring linkage between the first end and the second end.

15. The dishwashing appliance of claim 14, wherein the spring linkage further includes a cable extending along a portion of the spring linkage between the tension spring and the fastener.

16. The dishwashing appliance of claim 11, further comprising a guide wheel rotatably mounted to the cabinet, wherein the spring linkage is disposed along a bottom portion of the guide wheel.

17. The dishwashing appliance of claim 11, wherein the cabinet includes a frame extending along a bottom portion of the cabinet, and wherein the bent linkage latch is mounted to the frame opposite from the wash chamber along the lateral direction.

18. The dishwashing appliance of claim 11, wherein the fastener defines a bore hole to receive a linkage removal tool.

19. A dishwashing appliance defining a wash chamber and a mutually-orthogonal vertical direction, lateral direction, and transverse direction, the dishwashing appliance comprising:

a support leg;

a tub defining a front opening;

a door rotatably positioned at the front opening and providing selective access to the wash chamber;

a guide wheel rotatably mounted to the dishwashing appliance;

a spring linkage biasing the door toward a closed position, the spring linkage extending from a first end to a second end, the second end including a fastener selectively attached to the door, the spring linkage being disposed along a bottom portion of the guide wheel; and a bent linkage latch extending laterally and opposite of the wash chamber at one of a pair of opposing lateral sides below the door along the vertical direction, the bent linkage latch defining a vertically open latch channel to selectively receive the spring linkage when the fastener is detached from the door, wherein the spring linkage defines a recess notch complementary to the vertically open latch channel to be received therein.

20. The dishwashing appliance of claim 19, wherein the spring linkage further includes a cable extending along a portion of the spring linkage between the first end and the second end.

* * * * *